United States Patent Office 2,793,533
Patented May 28, 1957

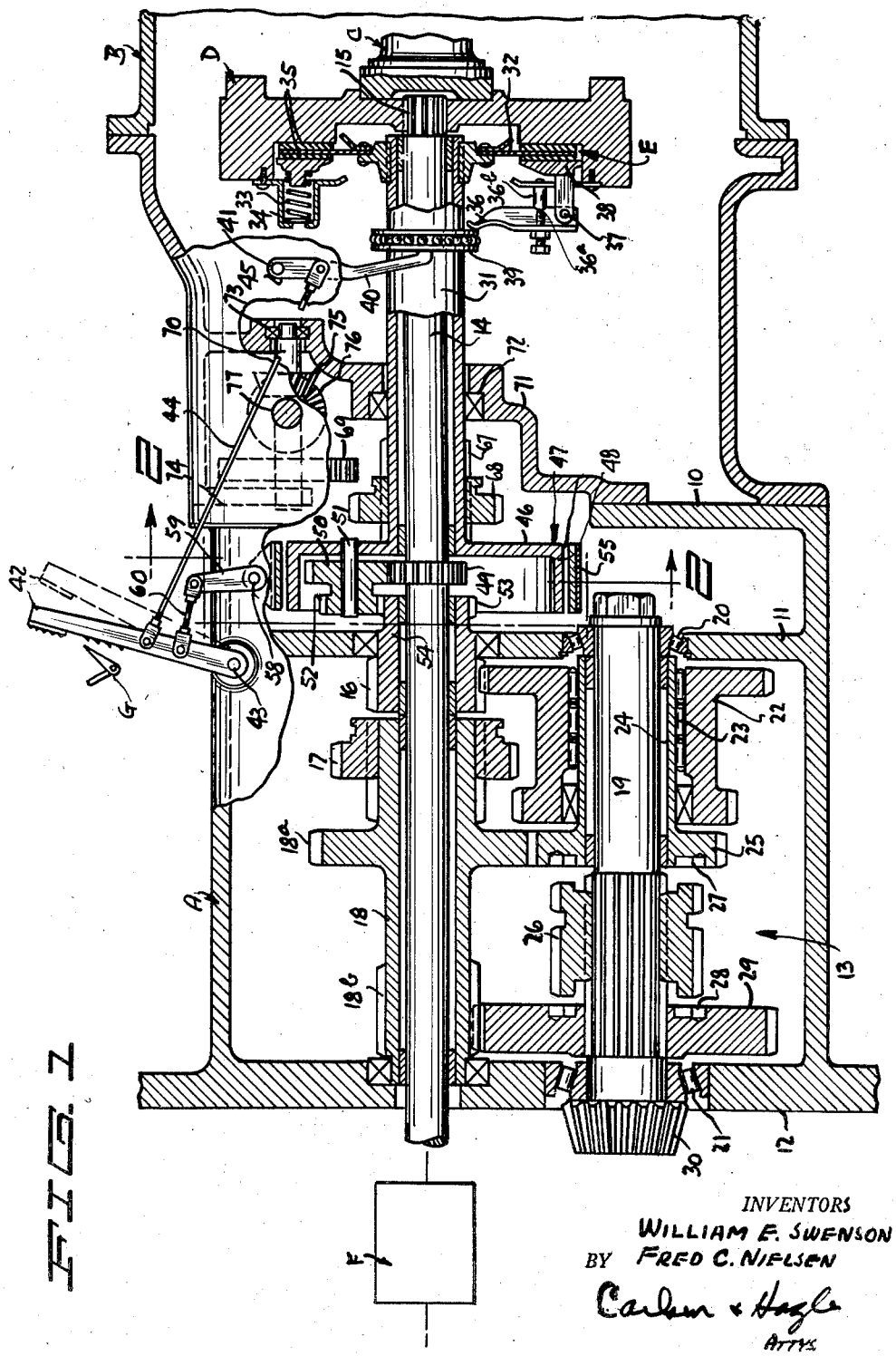

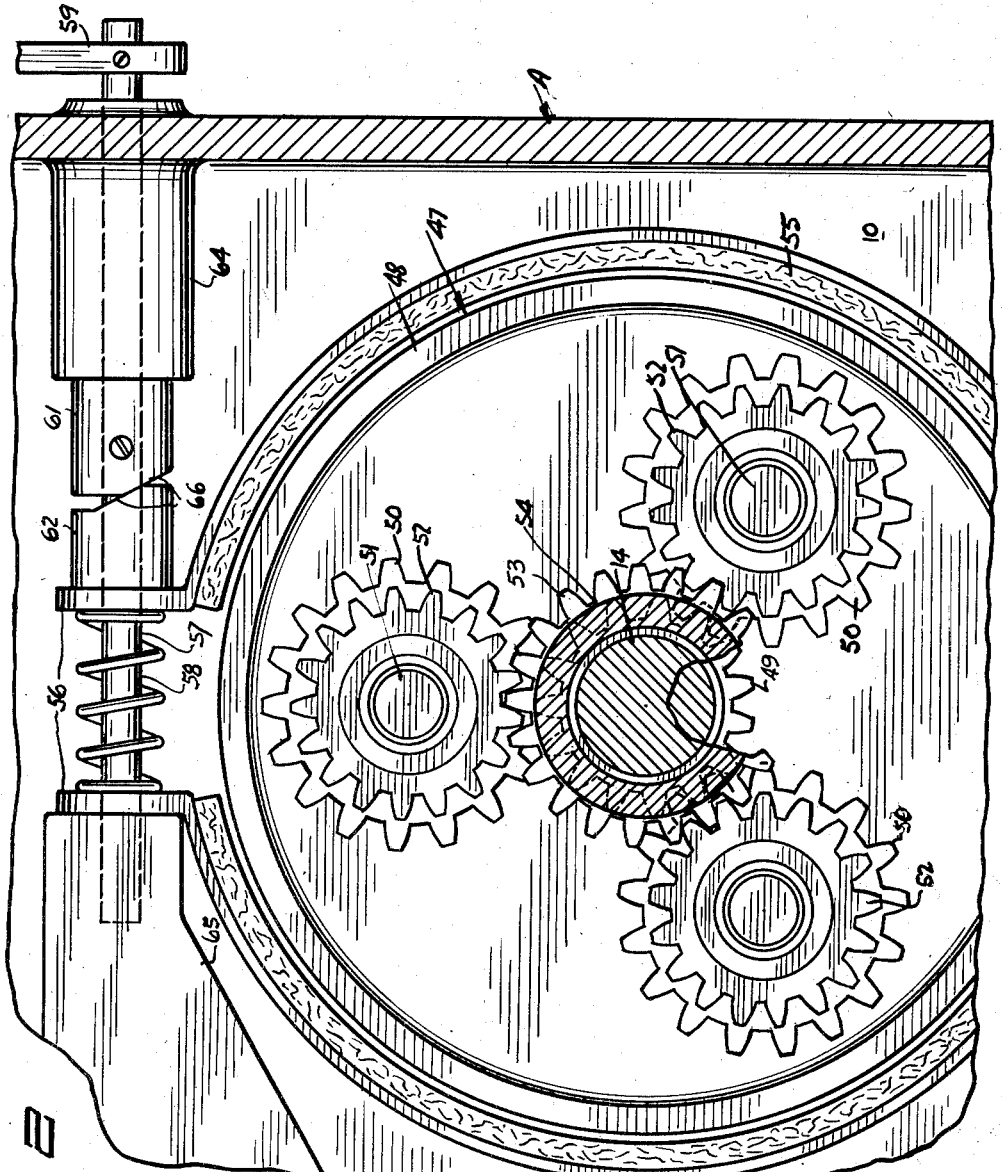

2,793,533

TRACTOR TRANSMISSION

William E. Swenson and Fred C. Nielsen, St. Paul, Minn., assignors to Minneapolis-Moline Company, Hopkins, Minn., a corporation of Minnesota Original application October 16, 1950, Serial No. 190,272, now Patent No. 2,747,416, dated May 29, 1956. Divided and this application February 13, 1956, Serial No. 565,199

11 Claims. (Cl. 74—15.63)

This invention relates to improvements in tractor transmissions and is a division from our co-pending application Serial No. 190,272, filed October 16, 1950, now Patent No. 2,747,416, issued May 29, 1956.

The primary object of this invention is to improve the propulsion and torque transmitting components of a tractor to facilitate the operation of the tractor in its work of operating auxiliary equipment as used on the farm and to permit the speed of the tractor to be varied while in motion by means of a two speed secondary or drive transmission unit which connects the main change speed transmission unit to the engine, which secondary transmission unit is provided with its own manual control so that it may be adjusted to two conditions in one of which it transmits high speed low torque power to the main transmission unit and in the other of which low speed high torque power is transmitted. This feature is extremely important to the successful operation of a farm tractor and as one example where the tractor is pulling a grain harvester it permits the operator to reduce the speed and at the same time increase the power applied to the traction wheels when the harvester encounters a spot in the field where the grain is exceptionally heavy or tangled.

A further object is to provide a transmission including one or more shafts for driving auxiliary equipment of various kinds, along with means connecting one of said shafts to the engine so that torque may flow uninterruptedly thereto regardless of adjustments being made to the respective transmission units. Obviously, and as will be readily understood by those skilled in the art, there are many instances where it is desired to maintain unbroken torque flow to this shaft so that the auxiliary equipment, be it whatever kind, may be maintained in operation regardless of the travel speed of the tractor.

These and other more detailed and specific objects will be disclosed in the course of the following specification, reference being had to the accompanying drawings, in which—

Fig. 1 is a longitudinal section through our transmission, showing a part of the tractor engine crankshaft and the flywheel thereon and thence rearwardly the components going to make up the change speed mechanisms, drive for the auxiliary equiment to be operated by the tractor and one of the manual controls.

Fig. 2 is an enlarged, fragmentary cross sectional view, taken substantially along the line 2—2 in Fig. 1.

Referring now more particularly and by reference characters to the drawing, A designates generally a housing for the transmission components, which housing usually is a part of the fore and aft extending chassis of the tractor itself and which extends rearwardly from the engine crankcase B. Said housing A has partitions or walls 10, 11 and 12 and is formed in sections bolted together as usual although such bolts are not here shown. The engine includes a crankshaft C to which is affixed the usual flywheel D and it is rearwardly of these parts, in the housing A, that the transmission and drive components are located as will now be described.

Between the partitions 11 and 12 there is located a main change speed transmission unit indicated generally at 13 having power trains of different speed ratios and which unit is essentially the same as that shown in Swenson Patent No. 2,660,900 and, of course, in the parent application heretofore previously identified. Since the precise constructional details of this transmission unit 13 are not of particular consequence so far as an understanding of our present invention is concerned only those parts of interest will be described. A shaft 14 is splined, as designated at 15, into the engine flywheel D and extends therefrom completely through the transmission unit 13 and upon this shaft there are rotatably mounted a drive gear 16, a shiftable gear 17 and a gear cluster 18, all of which form portions of the transmission unit itself. Positioned in parallelism with the aforesaid shaft 14, and located therebelow as here shown, is a countershaft 19 journaled in bearings 20 and 21 in the aforesaid partitions or walls 11 and 12 and this countershaft supports a gear cluster 22 including a gear meshing with the drive gear 16 and a gear which may be meshed with the aforesaid gear 17 when the latter is shifted to the left, as viewed in Fig. 1. A conventional form of one-way or overrunning clutch 23 is disposed between the gear cluster 22 and the hub 24 of a gear 25 which constantly meshes with the larger gear 18$^a$ upon the cluster 18 aforesaid and splined upon the countershaft 19 is a shiftable gear element 26 which may be selectively engaged at its opposite ends with teeth 27 and 28 upon the adjacent faces of the gear 25 and a gear 29, the latter being constantly in mesh with the smaller gear 18$^b$ of the cluster 18. As is explained in detail in the Swenson patent aforesaid this combination of gears provides for five forward speeds of the tractor according to the position of the shiftable elements of the transmission unit, and the drive to the traction wheels of the tractor is taken from the transmission through a bevel gear 30 secured to the countershaft 19 at the rear end thereof. The shaft 14 extends rearwardly from the housing A and may be utilized to drive auxiliary equipment supported on or drawn behind the tractor and it will be noted that since this shaft is splined at 15 to the flywheel D the shaft will operate at all times that the engine itself is in operation. For convenience this shaft 14 will be hereinafter designated as the power take-off shaft although it is not actually the power take-off in the sense in which that definition is conventionally used. The shaft 14 does, however, serve as the drive for the power take-off (not shown) which is usually mounted at the rear of the tractor.

Telescoped over the forward portion of the power take-off shaft 14 is another shaft 31 which is hollow, is journaled for rotation independently of shaft 14 and which will be referred to hereinafter as the driving shaft.

At its forward end this hollow driving shaft 31 has secured thereto a clutch disc 32 forming a part of the usual main or engine clutch E with which tractors are ordinarily provided. The clutch disc 32 is normally engaged by means of a series of clutch springs, one of which appears at 33, disposed within a suitable spring housing 34 secured to the flywheel D and exerting pressure between the peripheral edge portion of the disc and cooperating clutch rings 35. Clutch operating levers 36 are pivoted at 37 to a clutch pressure ring 38 and at their inner ends the levers are engaged by an anti-friction collar 39 mounted upon the hollow shaft 31 and in turn engaged by the lower end of a shipper lever 40 swingably suspended by a shaft 41 extending crosswise of the housing A. The levers 36 have bearings at 36$^a$ against pins 36$^b$ carried by the flywheel D so that forward travel of the collar 39 by actuation of the lever 40 will move the ring 38 in a rearward direction releasing the pressure between the clutch disc 32 and the clutch rings 35, thus interrupting the torque flow between the flywheel D and the hollow driving shaft 31. A manually operative means is provided for movement of the collar 39 and is here shown as consisting of a foot pedal 42 pivoted at 43 upon the housing A and connected by a link rod 44 to a short lever 45 upon the outer end of the shaft 41. Thus forward motion of the upper end of the foot pedal 42 will declutch the hollow shaft 31 from the engine, whereas when this pressure on the foot pedal is released the clutch springs 43 will assert themselves and engage the clucth E to drivingly connect hollow shaft 31 to the engine, as will be readily understood.

At its rear end, forwardly of the partition or wall 11, the driving shaft 31 is secured to or formed integrally with the forward end 46 of a planetary gear cage, designated generally at 47, having an annular outer wall 48. This cage 47 forms a part of a secondary or driving change speed transmission unit which includes a sun gear 49 secured upon the power take-off shaft 14 and meshing with a series of planetary gears 50 rotatably mounted by means of stub shafts or pins 51 upon the planetary cage 47. Connected to or formed integrally with the planetary gears 50 are other planetary gears 52 meshing with a sun gear 53 which forms a part of a tubular or hollow input shaft 54 surrounding the shaft 14 and journaled through the partition or wall 11 into the main transmission unit 13, wherein said input shaft is drivingly connected to or formed integrally with the aforesaid drive gear 16. Surrounding the planetary cage 47 is a locking means in the form of a parted brake band 55 and, as best seen in Fig. 2, the same has the usual outwardly extending ears 56 at its ends between which ears is braced an expansion coil spring 57 to normally expand the brake band so that it will not interfere with rotation of the planetary gear cage. An operating shaft 58 is extended transversely of the housing A through the aforesaid ears 56 and at one end projects from the housing for the application of an operating lever 59, which also is connected by a link 60 to the manual operating means or foot pedal 42 for the main or engine clutch hereinbefore described. Within the housing the shaft 58 is provided with a pair of cam collars 61 and 62. The outer collar bears against a bearing 644 projecting inwardly from the housing wall, whereas the other, inner collar 62 bears against one of the ears 56 and the other of said ears in turn bears against a projecting portion 65 of the opposite housing wall. The collars 61 and 62 have cooperating cam surfaces 66 so that upon rotation of the operating shaft 57 the ears 56 will be forced together and the brake band 56 constricted upon the annular wall 48 of the planetary gear cage in order to lock the cage against rotation, as will be understood.

Forwardly of this secondary or drive transmission unit the driving shaft 31 is externally splined at 67 to receive a gear 68 so that the same may be moved into driving engagement with a gear 69 upon a shaft 70 journaled in the upper part of the housing in a fore and aft direction. For supporting this shaft 70, and also to lend added support to the shafts 14—31, an irregularly shaped wall 71 is secured in the housing A having a bearing 72 receiving driving shaft 31 and a bearing 73 engaging the forward end of the shaft 70. The rear end of the shaft 70 is received in a similar bearing (not shown) in a depending web 74 in the upper part of the housing immediately forward of the planetary cage 47. Adjacent its forward end the shaft 70 carries bevel gear 75 meshing with a similar gear 76 upon a laterally extending auxiliary equipment drive shaft 77 which projects from the housing A for driving auxiliary equipment of various kinds.

In operation and under normal conditions, i. e., with the foot pedal 42 not actuated, the engine clutch E is closed and the engine transmits torque to both of the shafts 14 and 31. Under these conditions also the brake band 55 is disengaged from the planetary cage 47 and the shafts 14—31 now rotate in unison and the planetary gear drive or secondary transmission rotates as a unit to rotate the input shaft 54 of the main change speed transmission unit 13 at engine speed. The forward speed of the tractor is, of course, determined by the adjustment of this main transmission unit. To reduce the forward speed of the tractor the operator then depresses the clutch pedal 42 far enough to disengage the engine clutch E and then apply the brake band 55 to the planetary gear cage 47. As this occurs the rotation of the driving shaft 31 and cage 47 is brought to a halt but torque is transmitted from the power take-off shaft 14 (which continues to rotate since it is splined to the flywheel D) through the sun gear 49, the planet gears 50 and 52 and to the sun gear 53 on the input shaft 54 of the transmission. The gear ratios here shown are such that the speed at which the input shaft 54 is now driven is less than before so that the operator has the option of a high speed, low torque or low speed, high torque drive through the secondary transmission unit to the main transmission unit, under control of the foot pedal and without bringing the tractor to a halt as is usually necessary, in order to make change speed adjustments in the main transmission. The shaft 14 continues to rotate at all times that the tractor engine is running and along with the shaft 77 may be utilized to drive various kinds of auxiliary equipment from the tractor, both shafts being thus in effect power take-off shafts.

The effective lengths of the link rods 44 and 60 may be adjusted (as witness the threads thereon shown in Fig. 1) and thus there may be a dwell condition or lag between the time the manual control member 42 disengages the clutch E and applies the brake band 55 during which time the transmission 13 will be declutched from the engine and change speed adjustments may be made.

If desired a second clutch, shown diagrammatically at F may be provided in the power take-off shaft 14 to control the torque flow therethrough. A toe latch G is also shown for holding member 42 in clutch disengaging position.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. Power transmitting mechanism for a tractor having a change speed transmission, an engine driven flywheel and an engine clutch, a power take-off shaft connected directly to the flywheel independently of said clutch and extending straight through the transmission, a tubular input shaft for the transmission journaled about the power take-off shaft, a hollow driving shaft driven through said clutch and also journaled about the power take-off shaft, a planetary gear cage connected to rotate with said driving shaft, sun gears on the input shaft and the power take-off shaft, connected planet gears carried by the cage and meshing with the respective sun gears, a clamp band around the cage, and means for declutching the driving shaft while applying the clamp band to the cage whereby to transmit torque to the input shaft through the sun and planet gears.

2. Power transmitting mechanism for a tractor having a change speed transmission, an engine driven flywheel and an engine clutch, a power take-off shaft connected directly to the flywheel independently of said clutch and extending straight through the transmission, a tubular input shaft for the transmission journaled about the power take-off shaft, a driving shaft driven through said clutch and also journaled above the power take-off shaft, a planetary gear cage connected to rotate with said driving shaft, sun gears on the input shaft and the power take-off shaft, connected planet gears carried by the cage and meshing with the respective sun gears, a clamp band around the cage, a clutch pedal connected to operate the engine clutch, and a connection between the clutch pedal and clamp band for selectively clamping the cage against rotation when the clutch is disengaged.

3. For a tractor having an engine, mechanism for transmitting propulsion power from the engine and also torque from the engine for operation of auxiliary equipment, comprising a main change speed transmission having power trains of different speed ratios, the said transmission having an input shaft, a pair of telescope and relatively rotatable shafts arranged coaxially with respect to said input shaft, means driven by the engine and operatively connecting said telescope shafts to the engine for rotation thereby, a second change speed transmission unit connecting one of the said telescoped shafts to the input shaft of the transmission, a shaft for driving said auxiliary equipment, means driving connecting one of said telescoped shafts to the shaft for driving said auxiliary equipment, and means for controlling the second change speed transmission unit to selectively transmit high speed low torque output or low speed high torque output from the engine to the input shaft of the main change speed transmission.

4. For a tractor having an engine, mechanism for transmitting propulsion power from the engine and also torque from the engine for operation of auxiliary equipment, said mechanism comprising in combination, a main change speed transmission having power trains of different speed ratios, the said transmission having an input shaft, a pair of telescoped and relatively rotatable shafts arranged coaxially with respect to said input shaft and located between said input shaft and the engine, means driven by the engine and operatively connecting said telescoped shafts to the engine for rotation thereby, a second change speed transmission unit connecting one of the said telescoped shafts to the input shaft of the transmission, a shaft for driving said auxiliary equipment and located in a plane different from that of said telescoped shafts, means connecting the other of said telescoped shafts to the shaft for driving said auxiliary equipment, and means for controlling the second change speed transmission unit to selectively transmit high speed low torque output or low speed high torque output from the engine to the input shaft of the main change speed transmission.

5. For a tractor having an engine, mechanism for transmitting propulsion power from the engine and also torque from the engine for operation of auxiliary equipment, comprising a main change speed transmission having power trains of different speed ratios, the said transmission having an input shaft, a pair of telescoped and relatively rotatable shafts arranged coaxially with respect to said input shaft, means connecting one of said telescoped shafts to the engine for rotation thereby whenever said engine is operating, a clutch connecting the other of said telescoped shafts to the engine for selective rotation thereby, a second change speed transmission unit connecting one of the said telescoped shafts to the input shaft of the transmission, an auxiliary equipment drive shaft for driving said auxiliary equipment, means connecting one of said telescoped shafts to the said auxiliary equipment drive shaft, means distinct from said clutch for disabling the drive to the auxiliary equipment drive shaft, and means for controlling the second change speed transmission unit to selectively transmit high speed low torque output or low speed high torque output to the input shaft of the main change speed transmission.

6. For a tractor having an engine, mechanism for transmitting propulsion power from the engine and also torque from the engine for operation of auxiliary equipment, comprising a main change speed transmission having power trains of different speed ratios, the said transmission having an input shaft, a pair of telescoped and relatively rotatable shafts arranged coaxially with respect to said input shaft and extending forwardly toward the engine, means driven by the engine and operatively connecting said telescoped shafts to the engine for rotation thereby, a second change speed transmission unit connecting one of the said telescoped shafts to the input shaft of the transmission, an auxiliary equipment drive shaft, means for controlling the second change speed transmission unit to selectively transmit high speed low torque output or low speed high torque output to the input shaft of the main change speed transmission, the outermost of said telescoped shafts being shorter than the innermost shaft, and a gear on said outermost shaft and located forwardly of the second change speed transmission unit for operating the said auxiliary equipment drive shaft.

7. Power transmitting mechanism for a tractor having a main change speed transmission, an engine driven flywheel and an engine clutch, a power take-off shaft connected to the flywheel independently of said clutch and extending rearwardly straight through the transmission, a tubular input shaft for the transmission journaled about the power take-off shaft, a hollow driving shaft driven through said clutch and also journaled about the power take-off shaft, a second change speed transmission including a planetary gear cage connected for rotation by said hollow shaft, sun gears on the input shaft and the power take-off shaft, connected planet gears carried by the cage and meshing with the respective sun gears, and means for selectively controlling rotation of the planetary gear cage whereby to transmit torque from the engine to the input shaft of the main change speed transmission directly or through the intermediary of the sun and planet gears.

8. Power transmitting mechanism for a tractor having a main change speed transmission with gear clusters of different speed ratios, an engine driven flywheel and an engine clutch, comprising a power take-off shaft connected to the flywheel independently of said clutch and extending therefrom through one of said gear clusters in the main change speed transmission, a tubular input shaft for the transmission journaled about the power take-off shaft, a hollow driving shaft driven from the engine through said clutch and also jounaled about the power take-off shaft, a second change speed transmission having a planetary gear cage connected for rotation by said hollow shaft, sun gears on the input shaft and power take-off shaft, connected planet gears carried by the cage and meshing with the respective sun gears, locking means for selectively preventing rotation of the planetary gear cage, and manually controlled means for operating the clutch and said locking means for the planetary gear cage.

9. For a tractor having an engine with an engine clutch for transmitting torque from the engine, a main change speed transmission unit having power trains of different speed ratios, a power take-off shaft connected to the engine independently of said engine clutch and extending through said main change speed transmission unit, a second change speed transmission unit located between the engine and main transmission unit and supported by said power take-off shaft, a hollow driving shaft telescoped over the power take-off shaft and operatively connecting the second transmission unit through said engine clutch to the engine, means connecting the second transmission unit to the main transmission unit, and means controlling the second transmission unit to selectively transmit high torque low speed or low torque high speed output to the main transmission unit.

10. For a tractor having an engine with an engine clutch for transmitting torque from the engine, a main change speed transmission unit having power trains of different speed ratios, a power take-off shaft connected to the engine independently of said engine clutch and extending from the engine through said main change speed transmission unit, a second change speed transmission unit located between the engine and main transmission unit and supported by said power take-off shaft, a hollow driving shaft telescoped over the power take-off shaft and operatively connecting the second transmission unit through said engine clutch to the engine, means connecting the second transmission unit to the main transmission unit, means controlling the second transmission unit to selectively transmit high torque low speed or low torque high speed output to the main transmission unit, the said second transmission unit including a planetary gear mechanism one sun gear of which is secured to the power take-off shaft.

11. For a tractor having an engine, mechanism for transmitting propulsion power from the engine and also transmitting torque for operation of auxiliary equipment, the combination comprising, a main change speed transmission unit having an input shaft, an auxiliary equipment drive shaft, a second change speed transmission unit operatively connected to the input shaft of the main change speed transmission unit, a pair of telescoped and independently rotatable shafts extending from said second change speed unit toward the engine, means driven by the engine and connected to the telescoped shafts to rotate both said telescoped shafts, means on the innermost of said telescoped shafts for transmitting torque from the engine to said second change speed transmission unit, means for controlling the second change speed transmission unit to selectively transmit high speed low torque output or low speed high torque output from the engine to the input shaft of the main change speed transmission unit, and gears on the outermost of said telescoped shafts and the auxiliary equipment drive shaft for transmitting torque from the engine to said auxiliary equipment drive shaft.

No references cited.